US012341235B2

(12) United States Patent
Lee et al.

(10) Patent No.: US 12,341,235 B2
(45) Date of Patent: Jun. 24, 2025

(54) ANTENNA MODULE

(71) Applicant: AMOSENSE CO., LTD, Cheonan-si (KR)

(72) Inventors: Se Ho Lee, Cheonan-si (KR); Hyung Il Baek, Cheonan-si (KR); Kyung Hyun Ryu, Cheonan-si (KR)

(73) Assignee: AMOSENSE CO., LTD, Cheonan-si (KR)

(*) Notice: Subject to any disclaimer, the term of this patent is extended or adjusted under 35 U.S.C. 154(b) by 181 days.

(21) Appl. No.: 18/258,801

(22) PCT Filed: Dec. 8, 2021

(86) PCT No.: PCT/KR2021/018514
§ 371 (c)(1),
(2) Date: Jun. 21, 2023

(87) PCT Pub. No.: WO2022/145783
PCT Pub. Date: Jul. 7, 2022

(65) Prior Publication Data
US 2024/0047853 A1 Feb. 8, 2024

(30) Foreign Application Priority Data

Dec. 28, 2020 (KR) ........................ 10-2020-0184511
Dec. 8, 2021 (KR) ........................ 10-2021-0174473

(51) Int. Cl.
*H01Q 1/22* (2006.01)
*H01Q 1/48* (2006.01)

(52) U.S. Cl.
CPC ............. *H01Q 1/2283* (2013.01); *H01Q 1/48* (2013.01)

(58) Field of Classification Search
CPC ........ H01Q 1/2283; H01Q 1/48; H01Q 1/523; H01Q 21/065; H01Q 9/0414
See application file for complete search history.

(56) References Cited

U.S. PATENT DOCUMENTS

2019/0207304 A1* 7/2019 Kim ........................ H01L 24/25
2020/0203801 A1* 6/2020 Im ........................ H01Q 1/2283
2021/0257318 A1* 8/2021 Han .................. H01L 23/49827

FOREIGN PATENT DOCUMENTS

KR 10-2009-0081731 A 7/2009
KR 10-2015-0108147 A 9/2015
(Continued)

OTHER PUBLICATIONS

Hong et al. English Translation of KR20090081731(A) (Year: 2009).*
(Continued)

*Primary Examiner* — Daniel D Chang
(74) *Attorney, Agent, or Firm* — BROADVIEW IP LAW, PC

(57) ABSTRACT

An antenna module comprises a plurality of directors provided to be spaced apart from each other on the top surface of a first base layer; a second base layer disposed under the first base layer; a plurality of radiation patterns spaced apart from each other at positions corresponding to the respective directors on the top surface of the second base layer and functioning as antennas; an RF chipset disposed on bottom surface of the second base layer to transmit and receive RF signals; a connection pattern comprising a power feeding via electrode penetrating the second base layer and connecting the RF chipset and the radiation pattern; and a grounding via electrode that penetrates a part of the second base layer, is spaced apart from a side surface of the power feeding via electrode, and surrounds at least a portion of the side surface of the power feeding via electrode.

12 Claims, 10 Drawing Sheets

(56) References Cited

FOREIGN PATENT DOCUMENTS

| | | | |
|---|---|---|---|
| KR | 10-2019-0101352 | A | 8/2019 |
| KR | 10-2019-0103677 | A | 9/2019 |
| KR | 10-2020-0076379 | A | 6/2020 |

OTHER PUBLICATIONS

International Search Report for PCT/KR2021/018514 by Korean Intellectual Property Office dated Mar. 14, 2022.

* cited by examiner

ANTENNA MODULE

CROSS-REFERENCE TO RELATED APPLICATIONS

This application is a National Phase Entry Application of PCT Application No. PCT/KR2021/018514, filed on Dec. 8, 2021, which claims priority to Korean Patent Application No. 10-2020-0184511, filed on Dec. 28, 2020, and Korean Patent Application No. 10-2021-0174473, filed on Dec. 8, 2021, in Korean Intellectual Property Office, the entire contents of which are hereby incorporated by reference in its entirety.

TECHNICAL FIELD

The present invention relates to an antenna module, and more particularly, to a 5G antenna module capable of effectively achieving impedance matching.

BACKGROUND

In 5G or higher (hereinafter, referred to as "5G") communication developed as a next-generation communication, a low-dielectric/low-loss antenna module using a ceramic substrate and a magnetic sheet suitable for a millimeter wave (mmWave) frequency band is required. In addition, about 3% of the 5G antenna module radiation efficiency is lost due to heat issues, resulting in poor compatibility, so the need to solve the heat problem through the use of a dielectric and to solve the EMI noise through the use of a separate magnetic material is emerging.

In addition, the development of low dielectric/low-loss ultra-high frequency materials and antenna modules optimized for each application such as repeater/small cells, mobiles, and automobiles is being promoted.

However, since the wavelength of the millimeter wave frequency band used for the 5G antenna is very short, the impedance matching is difficult due to the large interinfluence between connection patterns implemented on the substrate. Therefore, there is a need for development of a technology capable of achieving impedance matching with respect to a connection pattern in a substrate.

SUMMARY

Technical Problem

The present invention has been devised in view of the above problems, and is directed to providing an antenna module capable of improving impedance matching by implementing a power feeding via electrode and a grounding via electrode in a coaxial line structure.

Technical Solution

In order to solve the above problems, the present invention provides an antenna module, including: a plurality of directors provided to be spaced apart from each other on the top surface of a first base layer; a second base layer disposed under the first base layer; a plurality of radiation patterns spaced apart from each other at positions corresponding to the respective directors on the top surface of the second base layer and functioning as antennas; an RF chipset disposed on bottom surface of the second base layer to transmit and receive RF signals; a connection pattern comprising a power feeding via electrode penetrating the second base layer and electrically connecting the RF chipset and the radiation pattern; and a grounding via electrode that penetrates a part of the second base layer, is spaced apart from a side surface of the power feeding via electrode, and surrounds at least a portion of the side surface of the power feeding via electrode.

According to a preferred embodiment of the present invention, the grounding via electrode may be disposed to be spaced apart from the power feeding via electrode at a predetermined interval while being concentric with the power feeding via electrode.

In addition, the second base layer may be implemented by stacking a plurality of low-temperature co-fired ceramic (LTCC) substrates.

In addition, the grounding via electrode may be disposed to be spaced apart from the radiation pattern in a lower direction of a location of the radiation pattern, and may be not provided at the uppermost LTCC substrate of the second base layer.

In addition, the grounding via electrode may be disposed to be spaced apart from the RF chipset in an upper direction of a location of the RF chipset, and may be not provided at a bottommost LTCC substrate of the second base layer.

In addition, the power feeding via electrode may include first and second power feeding via electrodes each passing through a plurality of different LTCC substrates among the second base layer, the first and second power feeding via electrodes may be provided at different plane positions of the second base layer, and the connection pattern may further include a redistribution layer electrically connecting the first and second power feeding via electrodes.

In addition, the grounding via electrode may be disposed to be spaced apart from the redistribution layer in an upper and lower direction of a location of the redistribution layer, and may be not provided in LTCC substrates in contact with upper and lower portions of a LTCC substrate having the redistribution layer.

In addition, the grounding via electrode may be disposed to be spaced apart from the redistribution layer in an upper and lower direction of a location of the redistribution layer, and may be provided in a region excluding a corresponding portion of the redistribution layer in first and second LTCC substrates in contact with upper and lower portions of the LTCC substrate having the redistribution layer.

In addition, the present invention may further include a grounding member provided in at least one of LTCC substrates having a grounding via electrode, and electrically connecting the grounding via electrode to a ground.

In addition, the present invention may further include a grounding member disposed to be spaced apart from the director on the top surface of the first base layer and electrically connected to a ground.

In addition, the present invention may further include a grounding member disposed to be spaced apart from the radiation pattern on the top surface of the second base layer and electrically connected to a ground.

In addition, the radiation pattern may emit millimeter wave (mmWave) radio waves.

Advantageous Effects

According to the present invention, since a grounding via electrode and a power feeding via electrode are implemented in a coaxial line structure by configuring the grounding via electrode to be surrounded by the power feeding via electrode in a concentric structure, impedance matching can be improved and at the same time, isolation between power feeding circuits can be improved.

DETAILED DESCRIPTION OF THE EMBODIMENTS

Figure 1:
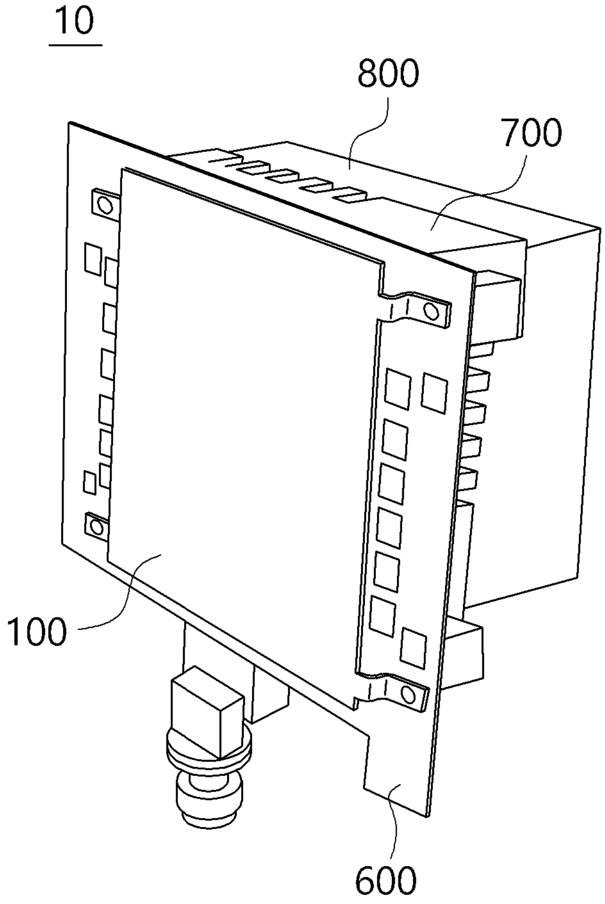
FIG. 1 is a perspective view of an antenna module according to an exemplary embodiment of the present invention.
Figure 2:
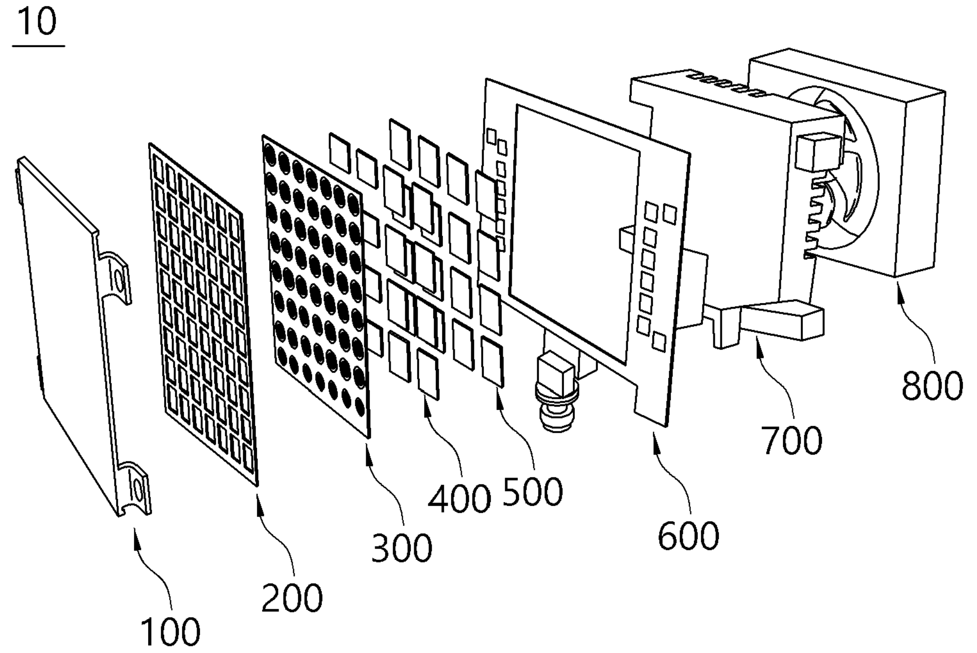
FIG. 2 is an exploded view of an antenna module according to an exemplary embodiment of the present invention.

Hereinafter, exemplary embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity of description of the present invention. Throughout the specification, like reference numerals denote like elements.

As shown in FIG. 1, the antenna module 10 according to an embodiment of the present invention may include an antenna cover 100, a spacer 200, a substrate 300, an RF chipset 400, a thermal interface material (TIM) 500, an evaluation board (EVB) 600, a heat sink 700, and a fan 800.

The antenna cover 100 is a component for protecting an internal antenna element or the like, which is a portion exposed from the substrate 300, and may include a plastic material. The antenna cover 100 may include a portion through which millimeter waves are transmitted and a portion supporting the transmission portion. That is, the antenna cover 100 may transmit the millimeter waves transmitted from the internal antenna element to the outside or transmit the millimeter waves transmitted from another device to the inside.

The spacer 200 is disposed between a director 311 of the substrate 300 and the antenna cover 100. That is, the spacer 200 is a component for forming a space between the antenna cover 100 and the director 311 of the substrate 300. For example, in the spacer 200, a portion corresponding to the director 311 may be implemented in an open form.

The substrate 300 includes a plurality of base layers 310, 320, and 330 implemented as a low-temperature co-fired ceramic (LTCC) substrate and is disposed between the spacer 200 and the antenna RF chipset 400. In this case, each of the base layers 310, 320, and 330 may be formed by stacking at least one LTCC substrate. In addition, the first and second base layers 310 and 320 may include a conductive pattern of a conductive material. However, the third base layer 330 may also be a molding layer formed of an epoxy molding compound (EMC) or the like rather than the LTCC substrate.

For example, the conductive pattern may include a director 311, a radiation pattern 321 of an antenna function, a power feeding via electrode 322 and a redistribution layer 323 which are connection patterns for electrically connecting the radiation pattern 321 and the RF chipset 400, and a grounding via electrode 324 spaced apart from a periphery of the power feeding via electrode 322. In addition, the conductive pattern may further include grounding members 312, 325, 326, and 327. In this case, the grounding via electrode 324 and the grounding members 312, 325, 326, and 327 may be electrically connected to the ground. In addition, the director 311 and the radiation pattern 321 may be referred to as an antenna element. However, a detailed structure of each conductive pattern will be described below.

The RF chipset 400 includes an integrated circuit (IC) for transmitting and receiving RF signals. The RF chipset 400 may generate and process RF signals in a millimeter wave frequency band, and at least one RF chipset may be provided. For example, the RF chipset 400 may be disposed on one side of the substrate 300, that is, on the third base layer 330, and may transmit and receive RF signals for each antenna element through its own terminal. The RF signal generated by the RF chipset 400 may be emitted from the radiation pattern 321 via a terminal and a connection pattern of the RF chipset 400. In addition, the external RF signal received by the radiation pattern 321 may be transferred to a terminal of the RF chipset 400 via a connection pattern and processed by the RF chipset 400. Hereinafter, a structure including the substrate 300 and the RF chipset 400 is referred to as a "module substrate".

The thermal interface material (TIM) 500 is formed of a heat transfer material and is provided on one side of the RF chipset 400, and may dissipate heat generated from the RF chipset 400 to the outside. That is, the TIM 500 is disposed between the RF chipset 400 and the heat sink 700 to transfer heat of the RF chipset 400 to the heat sink 700. The amount of heat transferred to the heat sink 700 may be increased by the TIM 500.

The evaluation board (EVB) 600 may be electrically connected to the RF chipset 400 to discharge various signals to the outside in order to evaluate the function of the antenna module 10. For example, the EVB 600 may include an RF signal input/output terminal for connection to the module substrate and a DC bias application terminal, and may evaluate and verify the performance of the module substrate.

The heat sink 700 may be disposed on one side of the TIM 500 to spread the emitted heat of the RF chipset 400 transferred from the TIM 500. That is, the heat sink 700 contacts the TIM 500 to absorb and dissipate heat transferred through the TIM 500. In this case, the fan 800 may be disposed on one side of the heat sink 700 to facilitate heat diffusion or cooling of the heat sink 700 by introducing external air into the heat sink 700.

The present invention may effectively suppress or cool the heat generation of the RF chipset 400 by disposing the TIM 500, the heat sink 700, and the fan 800 on the rear surface of the RF chipset 400, thereby improving characteristics and efficiency in the 5G millimeter wave band.

The antenna module 10 may have a radiation pattern 321 functioning as an antenna on the top surface of the substrate 300, and the antenna cover 100 may not be separately provided. That is, the overall size of the antenna module 10 may be miniaturized by disposing the RF chipset 400 on one side of the substrate 300 having the radiation pattern 321.

Hereinafter, a detailed structure of the substrate 300 (i.e., a detailed structure of each conductive pattern) will be described.

Figure 3:
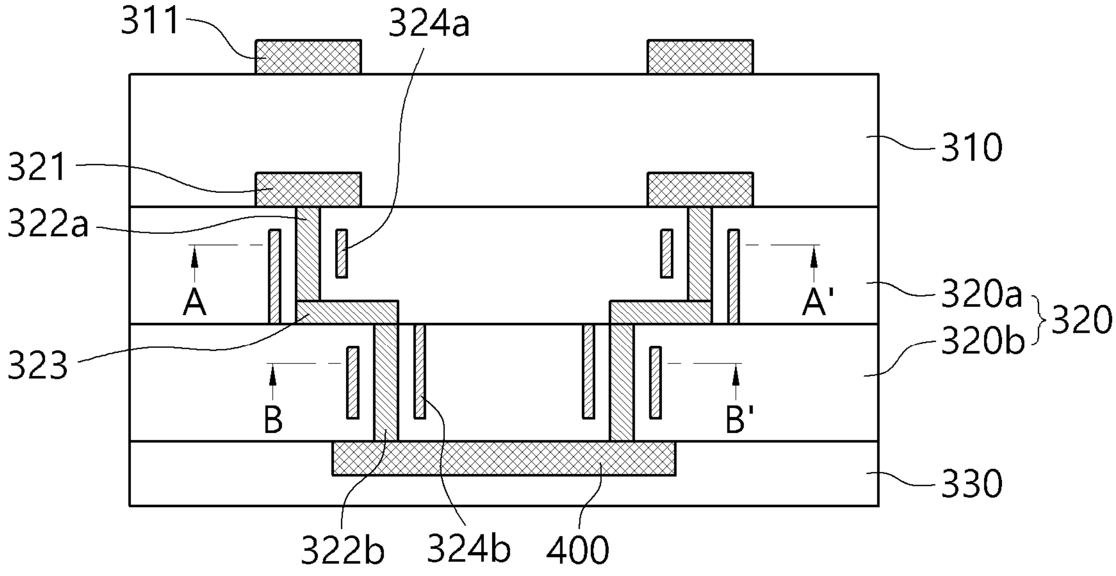
FIG. 3 is a cross-sectional view of a substrate and an RF chipset of an antenna module according to an exemplary embodiment of the present invention.

The substrate 300 may include a plurality of base layers 310, 320, and 330 stacked in turn, as shown in FIG. 3. In this case, each of the base layers 310, 320, and 330 may be implemented by stacking one or more LTCC substrates. However, the third base layer 330 may also be a molding layer formed of an epoxy molding compound (EMC) or the like rather than the LTCC substrate.

The first base layer 310 is disposed at the outermost side (i.e., the uppermost side in FIG. 3 or the like), and the plurality of directors 311 are provided on the top surface of the first base layer 310, which is a surface facing the antenna cover 100. In this case, the director 311 is disposed at a position corresponding to the radiation pattern 321, and is disposed to be spaced apart on the radiation pattern 321. Accordingly, the director 311 may increase the directivity of the millimeter wave emitted from the radiation pattern 321 and thus increase the gain of the antenna element.

Figure 9:
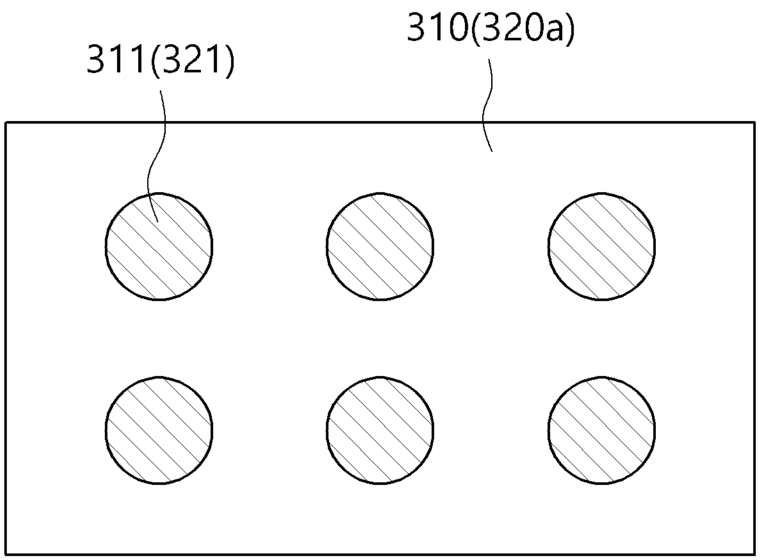
FIG. 9 is a plan view of a first base layer and a director (or a second-1 base layer and a radiation pattern) of an antenna module according to an exemplary embodiment of the present invention.

The director 311 may be formed in a shape corresponding to the radiation pattern 321 on the plane of the second base layer 320. For example, as shown in FIG. 9, when the radiation pattern 321 is circular on the plane of the second base layer 320, the director 311 may also be formed in the same circular shape. However, the present invention is not limited thereto, and the director 311 and the radiation pattern 321 may be formed in an oval or polygonal shape (e.g., a quadrangle) corresponding to each other on the plane of the second base layer 320. In addition, on the plane of the second base layer 320, the area of the director 311 may be the same as the area of the radiation pattern 321 or smaller than the area of the radiation pattern 321. However, as necessary, the director 311 and the first base layer 310 may not be provided.

Meanwhile, in FIG. 3 and the like of the present invention, the directors 311 are illustrated as being disposed to be spaced apart in the upper portion of one radiation pattern 321, but the present invention is not limited thereto. That is, a plurality of directors 311 may be stacked in the upper portion of one radiation pattern 321 so as to be spaced apart from each other. In this case, the plurality of stacked directors 311 may be disposed to be spaced apart from each other in the upper portion of a position corresponding to the radiation pattern 321, and thus the directivity and gain of the millimeter wave emitted from the radiation pattern 321 may be further increased.

The second base layer 320 may be disposed in the lower portion of the first base layer 310. In this case, a plurality of radiation patterns 321 may be formed on the top surface of the second base layer 320. For example, a cavity may be formed in the lower portion of the first base layer 310, and the radiation pattern 321 may be disposed in the corresponding cavity. To this end, the first base layer 310 may be implemented as a plurality of LTCC substrates, and a corresponding cavity may be formed in at least a partial region of the bottommost LTCC substrate.

Meanwhile, the RF chipset 400 may be disposed on the bottom surface of the second base layer 320. In this case, the terminal of the RF chipset 400 may be electrically connected to the power feeding via electrode 322 of the connection pad exposed on the bottom surface of the second base layer 320. That is, the RF chipset 400 may be disposed in the upper portion of the third base layer 330. For example, a cavity is formed in the upper portion of the third base layer 330, and the RF chipset 400 may be protected by disposing the RF chipset 400 in the corresponding cavity. Alternatively, the RF chipset 400 may be protected by molding the third base layer 330, which is a molding layer, with respect to the RF chipset 400 disposed on the bottom surface of the second base layer 320. In addition, the power feeding via electrode 322, the redistribution layer 323, and the grounding via electrode 324 may be included in the second base layer 320. Additionally, the third and fourth grounding members 326 and 327 may also be included in the second base layer 320.

In particular, the grounding via electrode 324 should be disposed to be electrically insulated from the power feeding via electrode 322, the radiation pattern 321, the redistribution layer 323, and the RF chipset 400. That is, the grounding via electrode 324 should be spaced apart from the horizontal direction (side surface) of the power feeding via electrode 322 but not exposed on the upper and lower surfaces of the second-1 base layer **320*a* and the second-2 base layer 320*b*, and should be spaced apart up and down from the radiation pattern 321 and the terminal of the RF chipset 400 disposed in the upper or lower portion of the second base layer 320 and the redistribution layer 323 disposed inside the second base layer 320**.

In order to correspond to each arrangement condition of the grounding via electrode 324, it may be preferable that the second base layer 320 is implemented by stacking a plurality of LTCC substrates. That is, it may be preferable that the second-1 base layer **320*a* is implemented in a form in which a plurality of LTCC substrates 320*a*-1, 320*a*-2, 320*a*-3, 320*a*-4, and 320*a*-5 are stacked, and the second-2 base layer 320*b* is implemented in a form in which a plurality of LTCC substrates 320*b*-1, 320*b*-2, 320*b*-3, 320*b*-4, and 320*b*-5** are stacked.

However, the number of the plurality of LTCC substrates of the second-1 base layer **320*a* and the second-2 base layer 320*b* is not limited to the number of the substrates shown in the drawings. A more detailed description of each arrangement condition of the grounding via electrode 324** will be described later.

The power feeding via electrode 322 and the redistribution layer 323 are a connection pattern for electrically connecting the terminal of the RF chipset 400 to the radiation pattern 321 and transmit RF signals. In this case, the power feeding via electrode 322 is a conductive layer for transmitting RF signals in the vertical direction in FIG. 3 and may be formed to penetrate the second base layer 320. For example, referring to FIGS. 5 to 8, a first power feeding via electrode **322*a* may be formed in a partial penetration region corresponding to each other in the LTCC substrates 320*a*-1**,

320*a*-2, 320*a*-3, 320*a*-4, and 320*a*-5 of the second-1 base layer 320*a*. In addition, a second power feeding via electrode 322*b* may be formed in a partial penetration region corresponding to each other in the LTCC substrates 320*b*-1, 320*b*-2, 320*b*-3, 320*b*-4, and 320*b*-5 of the second-2 base layer 320*b*.

The redistribution layer 323 is a conductive layer for transmitting RF signals in the horizontal direction in FIG. 3 and may be electrically connected to the power feeding via electrode 322 and may be formed to penetrate at least one LTCC substrate. That is, the first power feeding via electrode 322*a* and the second power feeding via electrode 322*b* may be formed at different positions on the plane of the base layer 320, and the redistribution layer 323 may electrically connect them. For example, referring to FIGS. 5 to 8, the redistribution layer 323 may be formed in one LTCC substrate 320*a*-5 of the second-1 base layer 320*a* so as to be connected to the first power feeding via electrode 324*a*. However, the present invention is not limited thereto, and the redistribution layer 323 may be formed in the second-2 base layer 320*b*.

Figure 4:
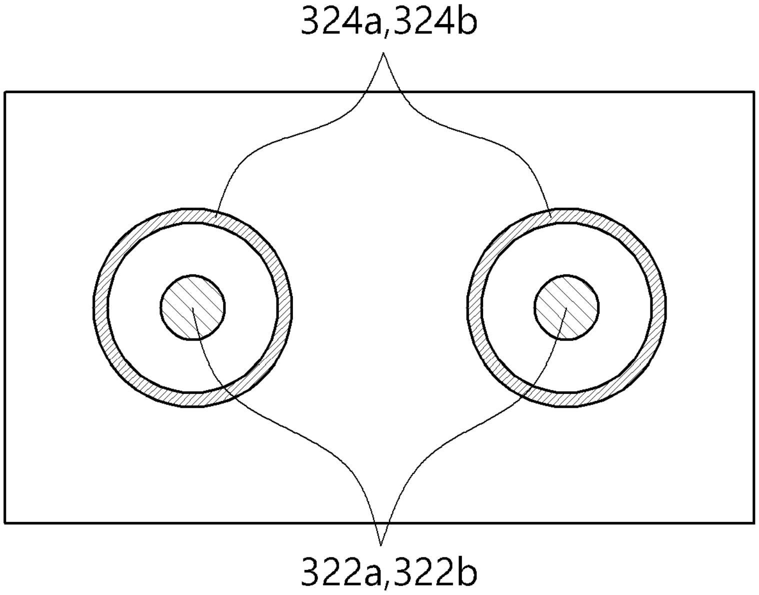
FIG. 4 is a plan view of a cross-section taken along dashed lines A-A' or B-B' in FIG. 3.

The grounding via electrode 324 is disposed to be spaced apart from a periphery of the power feeding via electrode 322. However, the grounding via electrode 324 needs to be electrically insulated from the power feeding via electrode 322. Accordingly, the grounding via electrode 324 is formed to be spaced apart from the power feeding via electrode 322 by a predetermined distance in the horizontal direction of FIG. 3. In this case, as shown in FIG. 4, when viewed on the plane of the cross-section along the dotted line A-A' or B-B' of the second base layer 320, the grounding via electrode 324 is concentrically formed with the power feeding via electrode 322 and is disposed to be spaced apart from the power feeding via electrode 322, and accordingly, the power feeding via electrode 322 and the grounding via electrode 324 form a coaxial line structure.

Since the wavelength of the millimeter wave frequency band is very short, the impedance matching is very difficult because the mutual influence between the connection patterns is very large. Accordingly, in the present invention, by disposing the spaced apart grounding via electrode 324 around the power feeding via electrode 322 through the above-described coaxial line structure, impedance matching with respect to the connection pattern can be easily achieved and at the same time, isolation between power feeding circuits can be improved.

For the structure of the coaxial line, in the at least one LTCC substrate of the second-1 base layer 320*a*, the first grounding via electrode 324*a* may be formed to penetrate the spaced portion around the first power feeding via electrode 322*a* with the penetration portion therebetween. In addition, in the at least one LTCC substrate of the second-2 base layer 320*b*, the second grounding via electrode 324*b* may be formed to penetrate the spaced portion around the second power feeding via electrode 322*b* with the penetration portion therebetween. In this case, the penetration portions of the first power feeding via electrode 322*a* and the second power feeding via electrode 322*b* may be formed at different positions on the plane of the LTCC substrate.

Figure 5:
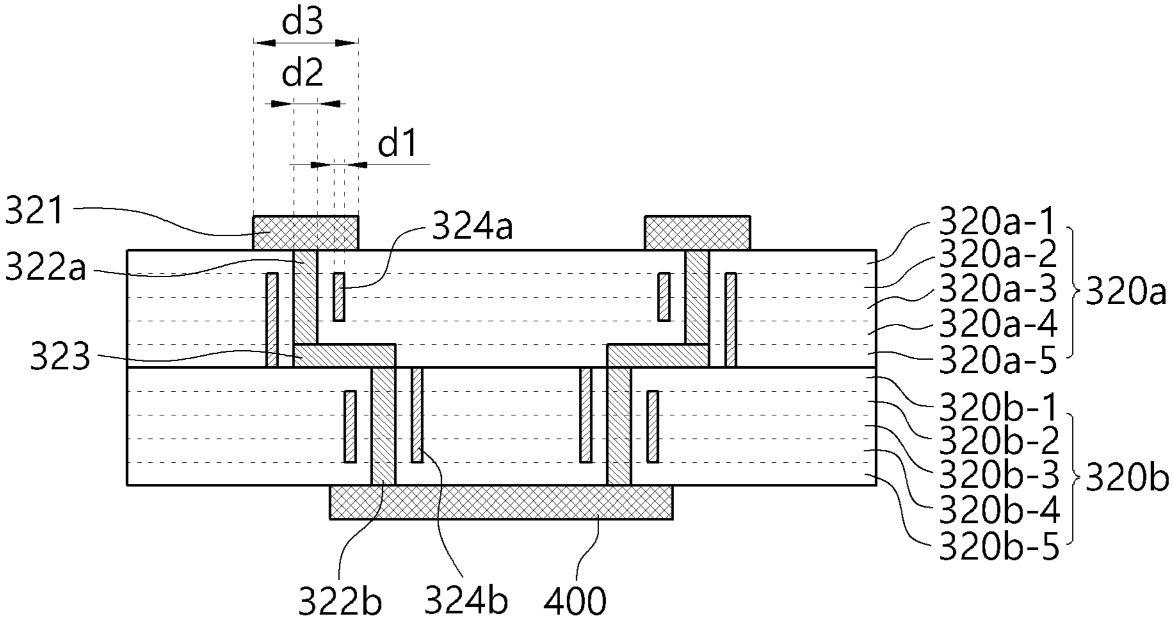
FIG. 5 is a cross-sectional view showing a substrate and an RF chipset of an antenna module in more detail according to an exemplary embodiment of the present invention.
Figure 6A:
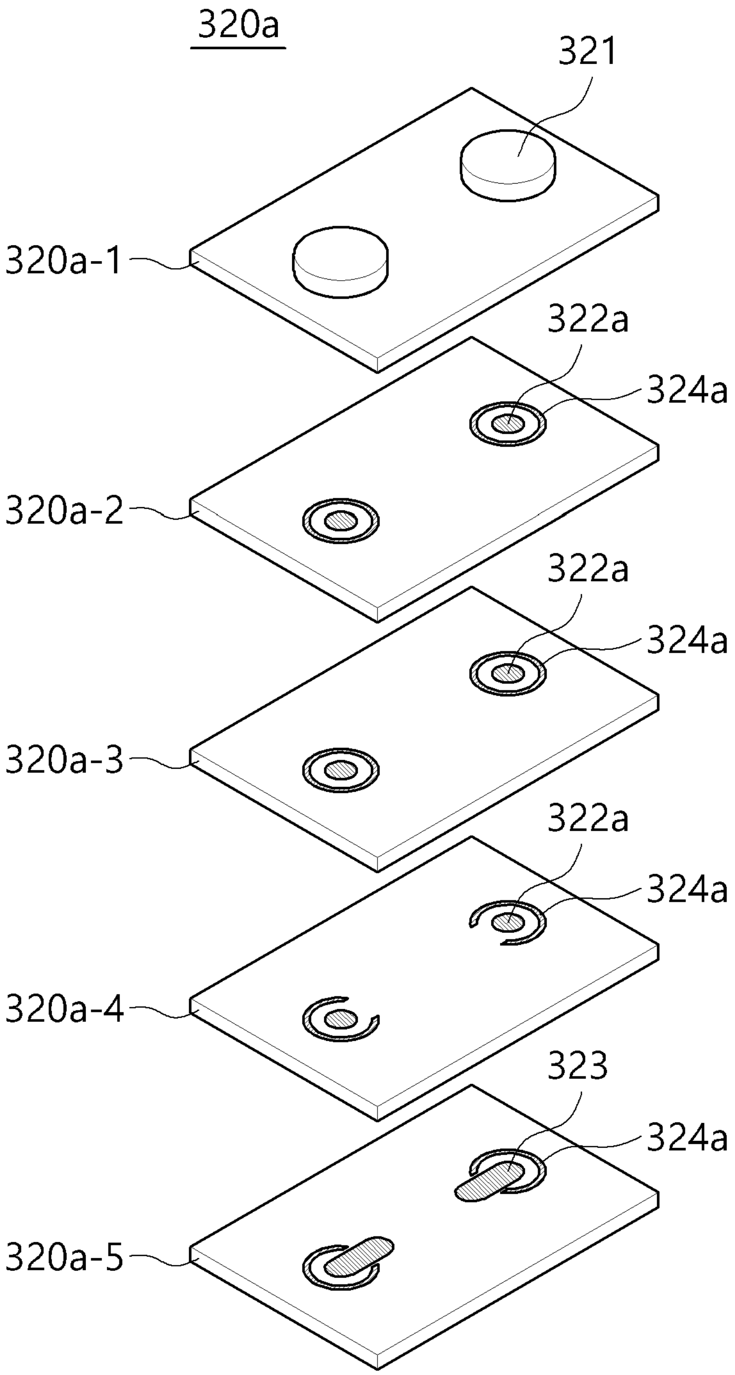
FIGS. 6A and 6B are an exploded view of a second base layer of an antenna module according to an exemplary embodiment of the present invention.
Figure 6B:
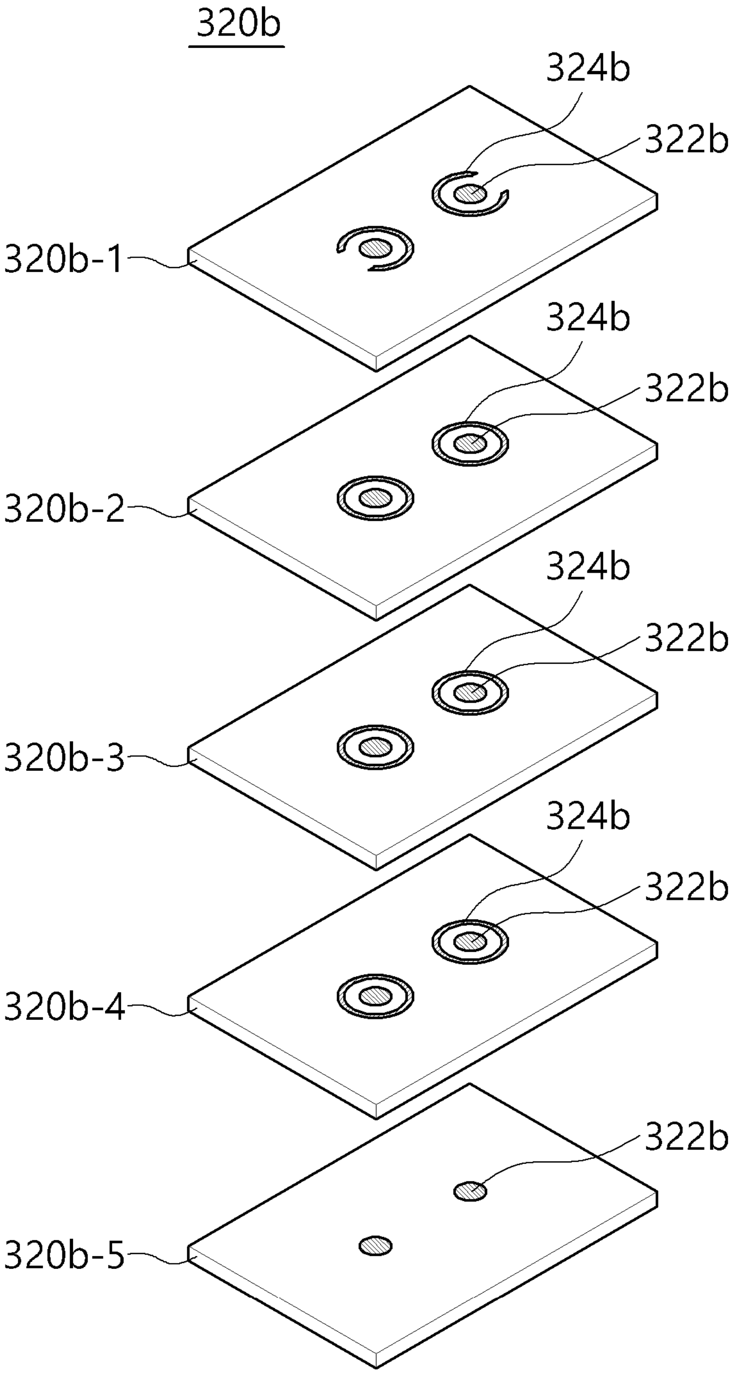

For example, as shown in FIGS. 5 and 6, in some LTCC substrates 320*a*-2, 320*a*-3, 320*a*-4, and 320*a*-5 among the second-1 base layer 320*a*, the first grounding via electrode 324*a* may be formed in a spaced apart portion around the first power feeding via electrode 322*a* with a penetration portion therebetween. In this case, in the case of the LTCC substrates 320*a*-2 and 320*a*-3 of the second-1 base layer 320*a*, the first grounding via electrode 324*a* is formed so as to go all around the penetration portion of the first power feeding via electrode 322*a*. On the other hand, in the case of the LTCC substrates 320*a*-4 and 320*a*-5 of the second-1 base layer 320*a*, the grounding via electrode 324 is formed only in a region except for the corresponding portion of the redistribution layer 323. This is because the first grounding via electrode 324*a* must not be in contact with not only the first power feeding via electrode 322*a*, but also the redistribution layer 323.

In addition, in some LTCC substrates 320*b*-1, 320*b*-2, 320*b*-3, and 320*b*-4 of the second-2 base layer 320*b*, the second grounding via electrode 324*b* may be formed in a spaced apart portion around the second power feeding via electrode 322*b* with a penetration portion therebetween. In this case, in the case of the LTCC substrates 320*b*-2, 320*b*-3, and 320*b*-4 of the second-1 base layer 320*b*, the second grounding via electrode 324*b* is formed so as to go all around the penetration portion of the second power feeding via electrode 322*b*. On the other hand, in the case of the LTCC substrates 320*b*-1 of the second-2 base layer 320*b* the second grounding via electrode 324*b* is formed only in a region except for the corresponding portion of the redistribution layer 323. This is because the second grounding via electrode 324*b* must not be in contact with not only the second power feeding via electrode 322*b*, but also the redistribution layer 323.

Figure 7:
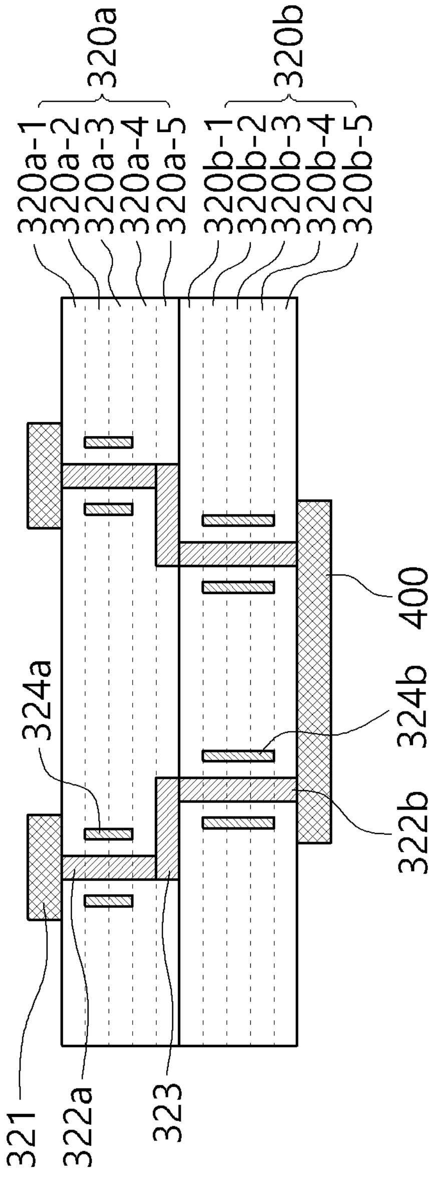
FIG. 7 is a cross-sectional view showing a substrate and an RF chipset of an antenna module in more detail according to another exemplary embodiment of the present invention.
Figure 8A:
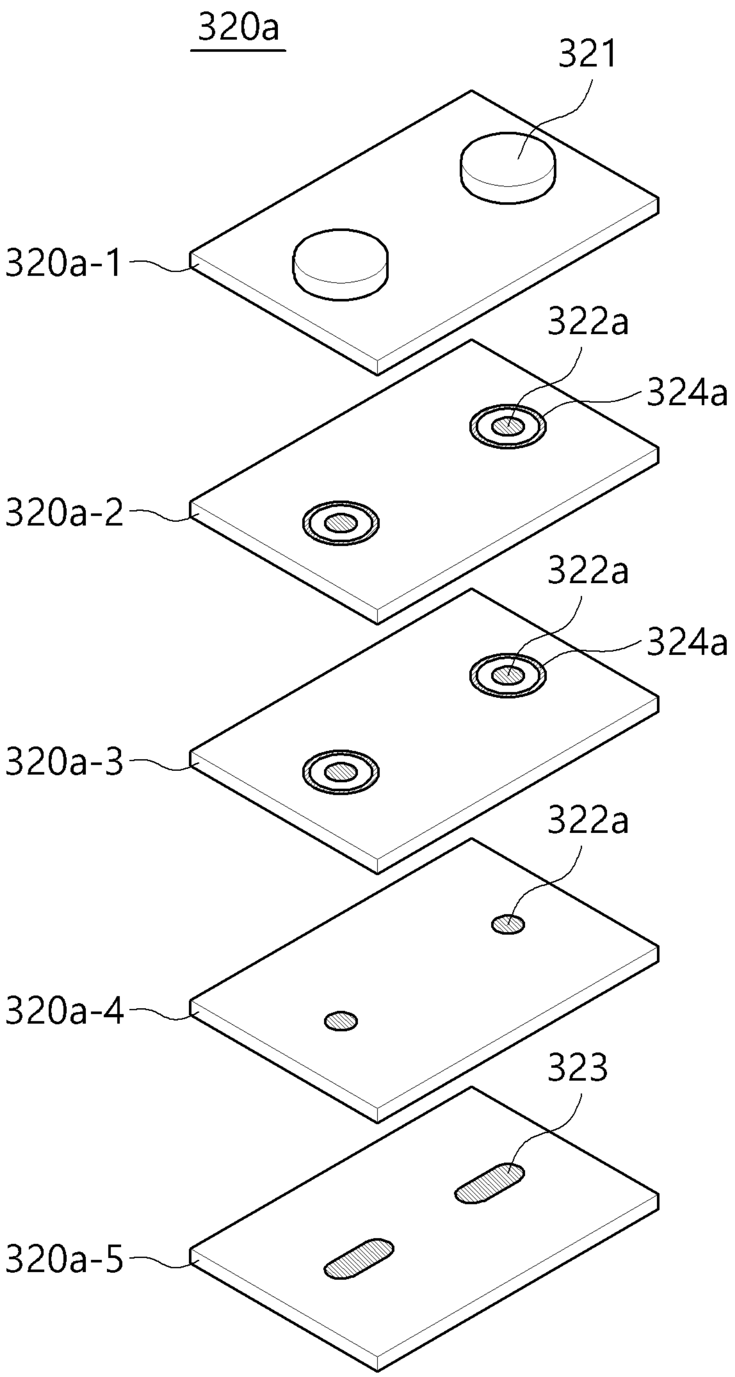
FIGS. 8A and 8B are an exploded view of a second base layer of an antenna module according to another exemplary embodiment of the present invention.
Figure 8B:
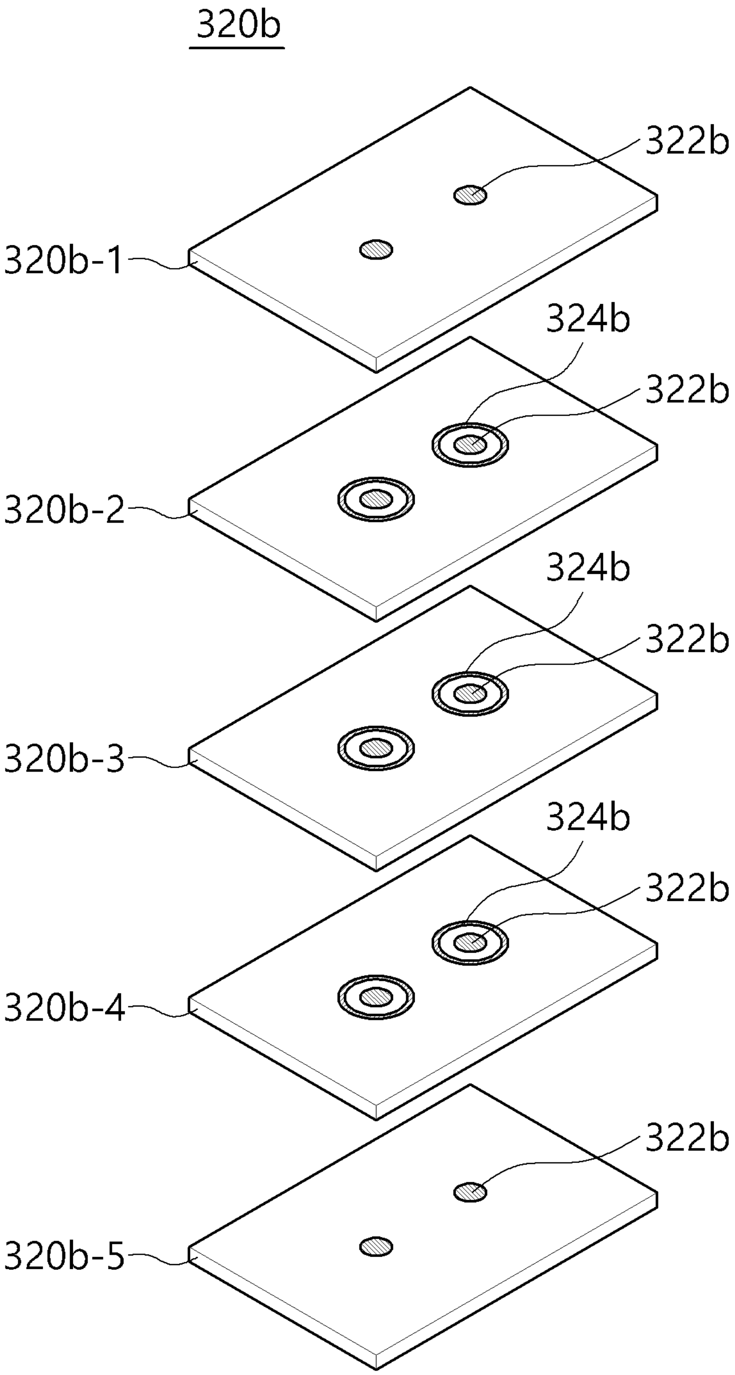

Meanwhile, as shown in FIGS. 7 and 8, the grounding via electrode 324 may be formed only on the LTCC substrates 320*a*-2 and 320*a*-3 among the second-1 base layer 320*a* and the LTCC substrates 320*b*-2, 320*b*-3, and 320*b*-4 among the second-2 base layer 320*b*. That is, unlike the case shown in FIGS. 5 and 6, the grounding via electrode 324 may not be formed on the LTCC substrates 320*a*-4, 320*a*-5, and 320*b*-1.

The grounding via electrode 324 needs to be electrically insulated from the radiation pattern 321 as well. Accordingly, the grounding via electrode 324 is formed to be spaced apart from the lower direction of the location of the radiation pattern 321 located at the uppermost part of the second base layer 320. For example, the grounding via electrode 324 may not be formed at the uppermost LTCC substrate 320*a*-1 of the second-1 base layer 320*a*.

The grounding via electrode 324 needs to be electrically insulated from the redistribution layer 323 as well. Accordingly, the grounding via electrode 324 is formed to be spaced apart from the upper and lower directions of the location of the redistribution layer 323. For example, in the LTCC substrates 320*a*-4 and 320*a*-5 of the second-1 base layer 320*a* and the LTCC substrate 320*b*-1 of the second-2 base layer 320*b*, the grounding via electrode 324 may not be formed or the grounding via electrode 324 may be formed only in a region except for a corresponding portion of the redistribution layer 323.

The grounding via electrode 324 needs to be electrically insulated from the RF chipset 400 as well. Accordingly, the grounding via electrode 324 is formed to be spaced apart from the upper direction of the location of the RF chipset 400 located at the bottommost part of the second base layer 320. For example, the grounding via electrode 324 may not be formed at the bottommost LTCC substrate 320*b*-5 of the second-2 base layer 320*b*.

In particular, since the power feeding via electrode 322 corresponds to a transmission line of an RF signal, it may be preferable that its thickness d2 is equal to or greater than a thickness d1 of the grounding via electrode 324. Of course, since the radiation pattern 321 needs to perform an antenna function, it is preferable that a diameter d3 of the radiation pattern 321 in a plane is greater than d1 and d2. Similarly, it is preferable that a diameter of the director 311 formed corresponding to the radiation pattern 321 in a plane is greater than d1 and d2.

Figure 10:
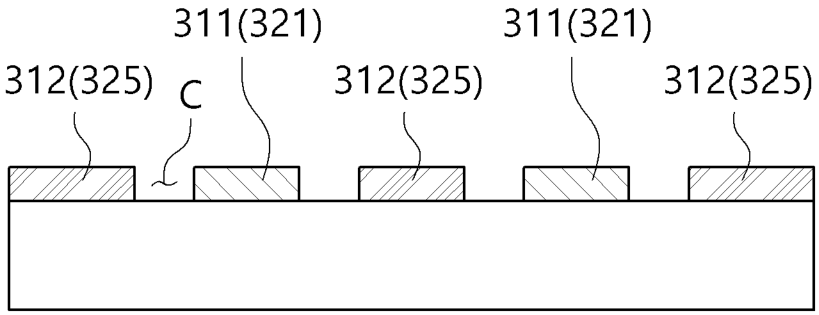
FIG. 10 is a cross-sectional view of a first base layer and a director (or a second-1 base layer and a radiation pattern) of an antenna module according to an exemplary embodiment of the present invention.

Referring to FIG. 10, a first grounding member 312 may be additionally formed on the top surface of the first base layer 310 in addition to the director 311. The first grounding member 312 is disposed to be spaced apart from the director 311 so as to be in non-contact with the director 311 on the top surface of the first base layer 310. That is, a cavity C is formed between the first grounding member 312 and the director 311 on the top surface of the first base layer 310. The first grounding member 312 may be disposed to surround the periphery of the director 311 in a plane and may be electrically connected to a ground.

In addition, a second grounding member 325 may be additionally formed on the top surface of the second-1 base layer 320*a* in addition to the radiation pattern 321. The second grounding member 325 is disposed to be spaced apart from the radiation pattern 321 so as to be in non-contact with the radiation pattern 321 on the top surface of the second-1 base layer 320*a*. That is, a cavity C is formed between the second grounding member 325 and the radiation pattern 321 on the top surface of the first base layer 310. The second grounding member 325 may be disposed to surround the periphery of the radiation pattern 321 in a plane and may be electrically connected to a ground.

Figure 11:
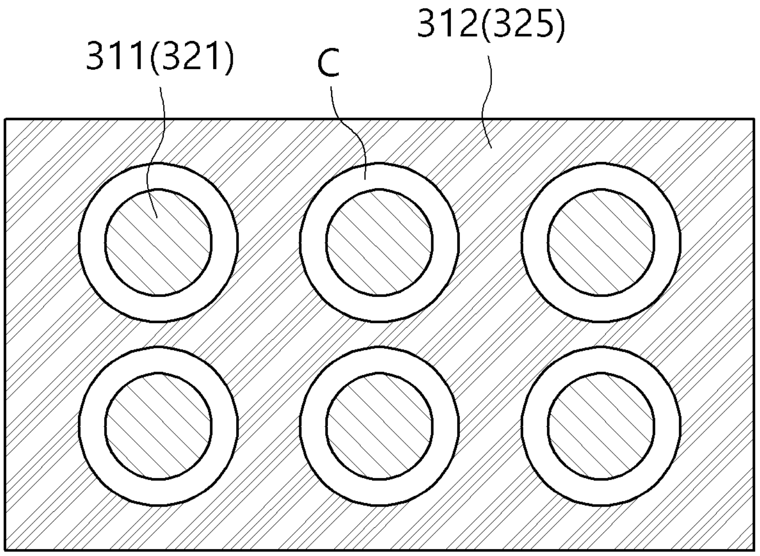
FIG. 11 is a plan view of a first base layer and a director (or a second-1 base layer and a radiation pattern) of an antenna module according to another exemplary embodiment of the present invention.

For reference, in FIG. 3 and the like, two directors 311 or radiation patterns 321 are shown for convenience, and in the plan views of FIGS. 9 and 11, six directors 311 or radiation patterns 321 are shown as more than two, but the present invention is not limited thereto.

Figure 12:
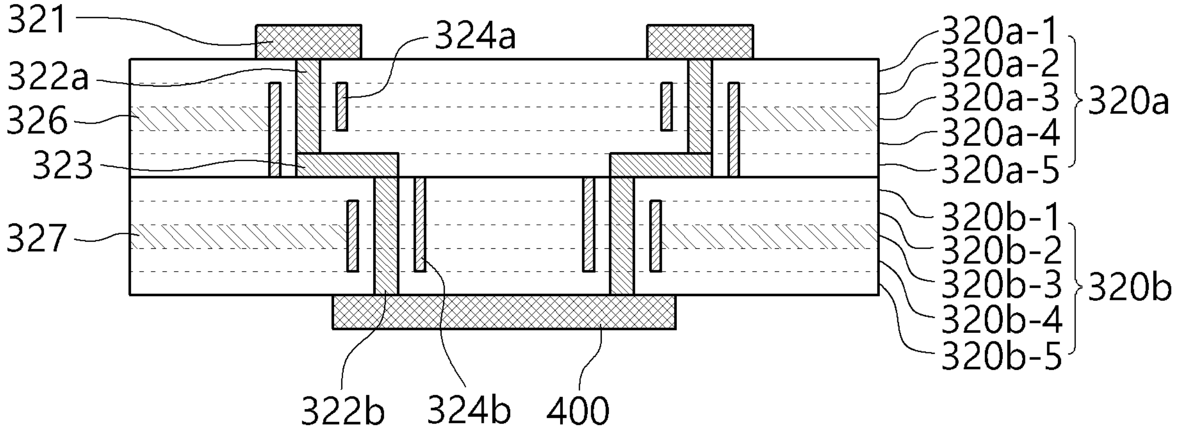
FIG. 12 is a cross-sectional view of a substrate and an RF chipset of an antenna module according to yet another exemplary embodiment of the present invention.

In addition, referring to FIG. 12, third and fourth grounding members 326 and 327 may be additionally formed in the second base layer 320. In this case, the third grounding member 326 is formed in at least one of the LTCC substrates of the second-1 base layer 320*a* and electrically connected to the first grounding via electrode 324*a*. In addition, the fourth grounding member 327 is formed in at least one of the LTCC substrates of the second-2 base layer 320*b* and electrically connected to the second grounding via electrode 324*b*. The third and fourth grounding members 326 and 327 may be electrically connected to a ground, thereby connecting the grounding via electrode 324 to the corresponding ground.

Meanwhile, in FIG. 3 and the like, the director 311 is shown to protrude from the top surface of the first base layer 310, but the present invention is not limited thereto. That is, a cavity may be formed in the top surface of the first base layer 310 and a director 311 may be formed in a form in which a conductive material is filled in the formed cavity. For example, among the LTCC substrates of the first base layer 310, a director 311 may be formed in at least the uppermost LTCC substrate by forming a through hole according to the corresponding cavity and filling the formed through hole with a conductive material.

In addition, in FIG. 3 and the like, the radiation pattern 321 is shown to protrude from the top surface of the second-1 base layer 320*a*, but the present invention is not limited thereto. That is, a cavity may be formed in the top surface of the second-1 base layer 320*a* and a radiation pattern 321 may be formed in a form in which a conductive material is filled in the formed cavity. For example, among the LTCC substrates 320*a*-1, 320*a*-2, 320*a*-3, 320*a*-4, and 320*a*-5 of the second-1 base layer 320*a*, a radiation pattern 321 may be formed in at least the uppermost LTCC substrate 320*a*-1 by forming a through hole according to the corresponding cavity and filling the formed through holes with a conductive material. In this case, the second grounding member 325 may also be formed in the same shape as the radiation pattern 321. However, unlike the case shown in FIG. 5 and the like, it may be preferable that the first grounding via electrode 324*a* is not formed in the uppermost LTCC substrate 320*a*-1 of the second-1 base layer 320*a*.

Although exemplary embodiments of the present invention have been described above, the idea of the present invention is not limited to the embodiments set forth herein. Those of ordinary skill in the art who understand the idea of the present invention may easily propose other embodiments through supplement, change, removal, addition, etc. of elements within the scope of the same idea, but the embodiments will be also within the idea scope of the present invention.

INDUSTRIAL APPLICABILITY

The present invention relates to an antenna module, and can provide an antenna module capable of effectively achieving impedance matching, and thus has industrial applicability.

What is claimed is:

1. An antenna module, comprising:

a plurality of directors provided to be spaced apart from each other on the top surface of a first base layer;

a second base layer disposed under the first base layer;

a plurality of radiation patterns spaced apart from each other at positions corresponding to the respective directors on the top surface of the second base layer and functioning as antennas;

an RF chipset disposed on bottom surface of the second base layer to transmit and receive RF signals;

a connection pattern comprising a power feeding via electrode penetrating the second base layer and electrically connecting the RF chipset and the radiation pattern; and a grounding via electrode that penetrates a part of the second base layer, is spaced apart from a side surface of the power feeding via electrode, and surrounds at least a portion of the side surface of the power feeding via electrode, wherein:

the power feeding via electrode comprises first and second power feeding via electrodes provided at different plane positions of the second substrate layer, the connection pattern further comprises a redistribution layer electrically connecting the first and second power feeding via electrodes, and the grounding via electrode is disposed to be spaced apart from the redistribution layer in an upper and lower direction of a location of the redistribution layer.

2. The antenna module of claim 1, wherein the grounding via electrode is disposed to be spaced apart from the power feeding via electrode at a predetermined interval while being concentric with the power feeding via electrode.

3. The antenna module of claim 1, wherein the second base layer is implemented by stacking a plurality of low-temperature co-fired ceramic (LTCC) substrates.

4. The antenna module of claim 3, wherein the grounding via electrode is disposed to be spaced apart from the radiation pattern in a lower direction of a location of the radiation pattern, and is not provided at the uppermost LTCC substrate of the second base layer.

5. The antenna module of claim 3, wherein the grounding via electrode is disposed to be spaced apart from the RF chipset in an upper direction of a location of the RF chipset, and is not provided at a bottommost LTCC substrate of the second base layer.

6. The antenna module of claim 3, wherein the first and second power feeding via electrodes each passing through a plurality of different LTCC substrates among the second base layer.

7. The antenna module of claim 6, wherein the grounding via electrode is not provided in LTCC substrates in contact with upper and lower portions of a LTCC substrate having the redistribution layer.

8. The antenna module of claim 6, wherein the grounding via electrode is provided in a region excluding a corresponding portion of the redistribution layer in first and second LTCC substrates in contact with upper and lower portions of the LTCC substrate having the redistribution layer.

9. The antenna module of claim 3, further comprising a grounding member provided in at least one of LTCC substrates having a grounding via electrode, and electrically connecting the grounding via electrode to a ground.

10. The antenna module of claim 1, further comprising a grounding member disposed to be spaced apart from the director on the top surface of the first base layer and electrically connected to a ground.

11. The antenna module of claim 1, further comprising a grounding member disposed to be spaced apart from the radiation pattern on the top surface of the second base layer and electrically connected to a ground.

12. The antenna module of claim 1, wherein the radiation pattern emits millimeter wave (mmWave) radio waves.

* * * * *